United States Patent
Shiokawa (10) Patent No.: US 9,375,637 B2
(45) Date of Patent: Jun. 28, 2016

(54) GAME MACHINE FOR DISPLAYING OPTION SCREEN AND GAME PROGRAM FOR DISPLAYING OPTION SCREEN

(71) Applicant: SQUARE ENIX CO., LTD., Tokyo (JP)

(72) Inventor: Yosuke Shiokawa, El Segundo, CA (US)

(73) Assignee: SQUARE ENIX CO., LTD., Tokyo (JP)

( * ) Notice: Subject to any disclaimer, the term of this patent is extended or adjusted under 35 U.S.C. 154(b) by 219 days.

(21) Appl. No.: 13/920,719

(22) Filed: Jun. 18, 2013

(65) Prior Publication Data

US 2014/0235335 A1 Aug. 21, 2014

Related U.S. Application Data

(60) Provisional application No. 61/766,868, filed on Feb. 20, 2013.

(51) Int. Cl.
*A63F 13/00* (2014.01)
*A63F 13/40* (2014.01)

(52) U.S. Cl.
CPC .......... *A63F 13/00* (2013.01); *A63F 13/10* (2013.01); *A63F 2300/308* (2013.01)

(58) Field of Classification Search
None
See application file for complete search history.

(56) References Cited

U.S. PATENT DOCUMENTS

| | | | | |
|---|---|---|---|---|
| 5,680,534 | A * | 10/1997 | Yamato et al. | 345/473 |
| 6,111,573 | A * | 8/2000 | McComb | G09G 5/363 345/661 |
| 6,384,827 | B1 * | 5/2002 | Dawkins | 345/467 |
| 6,699,127 | B1 * | 3/2004 | Lobb et al. | 463/43 |
| 2002/0032696 | A1 * | 3/2002 | Takiguchi et al. | 707/500.1 |
| 2003/0064781 | A1 * | 4/2003 | Muir | 463/20 |
| 2004/0061723 | A1 * | 4/2004 | Tai et al. | 345/779 |
| 2004/0219968 | A1 * | 11/2004 | Fiden et al. | 463/20 |
| 2005/0020359 | A1 * | 1/2005 | Ackley et al. | 463/31 |
| 2007/0117635 | A1 * | 5/2007 | Spanton et al. | 463/43 |
| 2008/0119211 | A1 * | 5/2008 | Paas et al. | 455/466 |
| 2010/0001959 | A1 * | 1/2010 | Kim | G06F 3/04886 345/169 |
| 2010/0218141 | A1 * | 8/2010 | Xu et al. | 715/834 |
| 2012/0192111 | A1 * | 7/2012 | Hsu et al. | 715/821 |
| 2013/0159375 | A1 * | 6/2013 | Perry et al. | 709/201 |

FOREIGN PATENT DOCUMENTS

JP 2005-006992 1/2005

* cited by examiner

*Primary Examiner* — Tramar Harper

(74) *Attorney, Agent, or Firm* — Duane Morris LLP (57) ABSTRACT

In a game machine 1 for displaying an option screen that displays an option constitution image SEP indicating two or more options CHC on a display 11 so as to select the options by a player, two or more options are located on the option constitution image SEP, being scattered on a plane when displaying the options CHC. When locating the options on the option constitution image and displaying these, such a control is done that the letters comprising each option are set by a different size and the options having respectively different size of letters are located on the option constitution image. The letters comprising each option displayed on the option constitution image are enlarged or reduced every option at a predetermined display time cycle.

3 Claims, 11 Drawing Sheets

| | DISPLAY POSITION | | SIZE | INDICATION CYCLE DIRECTION | |
|---|---|---|---|---|---|
| | X | Y | | | |
| Confronting | ○○○ | ××× | 15 | ⇨ | AR1 |
| Unarmed | △△△ | ◎◎◎ | 14 | ⇨ | AR1 |
| Surrendering | ... | ... | 1 | ⇦ | AR2 |
| Dead | ... | ... | 1 | ⇦ | AR2 |
| Armed | ... | ... | 14 | ⇨ | AR1 |
| Dying | ... | ... | 5 | ⇦ | AR2 |
| Releasing | ... | ... | 15 | ⇨ | AR1 |
| Alive | ... | ... | 5 | ⇦ | AR2 |

GAME MACHINE FOR DISPLAYING OPTION SCREEN AND GAME PROGRAM FOR DISPLAYING OPTION SCREEN

TECHNICAL FIELD

The invention relates to a game machine for displaying option screen and game program for displaying option screen through which an option screen to be displayed at a time when a player selects one or more options from two or more options during execution of a game scenario can be effectively displayed to the player, having a small area and a high visibility.

BACKGROUND ART

A well known structure in such a conventional game machine is that two or more options are presented to a player on a screen at a time of a branch of a story or an event in a scenario and the player is invited to select a proper option out of these options through an input portion, such as a controller, and the story or the event corresponding to the selected option is selectively executed (for example, patent related document 1).

PRIOR ART

Patent Related Document

Patent related document 1: Patent application publication No. 2005-006992

DISCLOSURE OF INVENTION

Problems to be Solved by Invention

In such an option presentation method, two or more options are merely displayed on the screen with the size of an equal letter. For this reason, it takes much time for the player to read the displayed options in turn and understand these options if there are many options presented, and the player may find it to be too troublesome to select options.

It is necessary to select two or more options in some games. In such a case, a lot of numbers of options should be presented for the player to select for this reason. Then, an area for displaying the options on the display screen is made bigger, and the player is easy to feel a discrepancy between the area where the options are displayed and a previous screen based upon a game scenario and to have a feeling of interruption of the story that may be a cause that funs on the game are damaged.

Then, an object of the invention is to provide the game machine for displaying option screen and the game program for displaying option screen wherein a relatively small area is sufficient even if there are many options to be displayed, the indication with full of changes is possible without uniformly displaying two or more options, it is easy to attract the interest of the player to each option, and it is possible to reduce the feeling of the work at the time of selection of the options thereby.

Means for Solving Problems

A first aspect of the invention is a game machine for displaying an option screen (1) on a display (11) that includes an option constitution image (SEP) indicating two or more options (CHC) for selection by a player through an input portion (10). Said game machine including a non-transitory game computer-readable storage medium tangibly embodying a program of instructions executable by the game machine, where the program of instructions comprising:

an option locator (9) that places images for the two or more options at predetermined positions on the option constitution image (SEP), said predetermined positions being scattered on a plane when displaying the options (CHC) and the images comprise different size letters for each of the two or more options;

a letter indicator (9) that places different size letters representing the two or more options (CHC1 to CHC8) on the option constitution image and displaying on the display (11); and an enlargement/reduction indicator (9) that enlarges or reduces the letters displayed on the option constitution image at a predetermined indication time cycle for each of the two or more options and displays the images for the two or more options comprising letters of various sizes on the display at a point in time and the various sized letters are located adjacent to each other in order to make a more efficient utilization of the display's limited display area.

A second aspect of the invention is the game machine for displaying option screen, wherein the enlargement/reduction indicator (9) further has an enlargement/reduction cycle selector (9) that selects and executes either control of a) reduction after enlargement and b) enlargement after reduction every option (CHC) regarding the letters comprising the option initially displayed on the display (11).

A third aspect of the invention is the game machine for displaying option screen, wherein further comprising a game progress controller (5) that produces a scenario image (SPC) and advances a game scenario, and an option display image producer (7) that produces an option display image (CDP) by superimposing the option constitution image on the scenario image (SPC) and displays on the display when displaying the option constitution image (SEP).

A fourth aspect of the invention is a game program for displaying option screen (GPR) through which a computer functions as means for displaying an option constitution image (SEP) indicating two or more options on a display (11) so as to select the option (CHC1 to CHC8) by a player through an input portion (10), the game program for displaying option screen gets the computer to function as the following:

an option locator (9) that locates the two or more options (CHC1 to CHC8) at predetermined indication positions on the option constitution image (SEP), being scattered on a plane when displaying the options;

a letter indicator (9) that controls to locate the options (CHC1 to CHC8) having respectively different size of letters on the option constitution image by setting the letters comprising each option with a different size when locating the options (CHC1 to CHC8) on the option constitution image (SEP) and displaying on the display (11); and an enlargement/reduction indicator (9) that enlarges or reduces the letters comprising each option displayed on the option constitution image at a predetermined indication time cycle every each option.

Effects of the Invention

According to the first and forth aspects of the invention, two or more options are displayed with respectively different sizes on the option constitution image (SEP), being scattered on a plane, and are displayed. The displayed two or more options are independently enlarged or reduced at predetermined indication time cycles, so that a relatively small area is sufficient even if there are many options to be displayed. The indication with full of changes is possible without equally displaying two or more options. Options displayed in this manner are easy for the player to read and, thus, the player would find it easier to select options.

According to the second aspect of the invention, each option is controlled to be displayed by either a) reduction after enlargement or b) enlargement after reduction. So, it is possible to effectively display many options with a limited indication space by such a control that one option image is reduced while another option image is enlarged.

Additionally, some options are gradually enlarged while other options are gradually reduced. For this reason, expansion and shrinkage of the options are always displayed on the whole screen, and it is possible to depict the changing mood of a character thereby.

According to the third aspect of the invention, when displaying the option constitution image (SEP), the option display image (CDP) is produced by superimposing the option constitution image on the scenario image (SPC), and it is possible to display the image having a high reality of sense thereby.

The number in parentheses shows the corresponding element in the drawings for the sake of convenience, accordingly, the descriptions are not restricted and bound by the descriptions on the drawings.

EMBODIMENT FOR CARRYING OUT THE INVENTION

An embodiment of the invention is now explained, referring to appended drawings.

Figure 9:
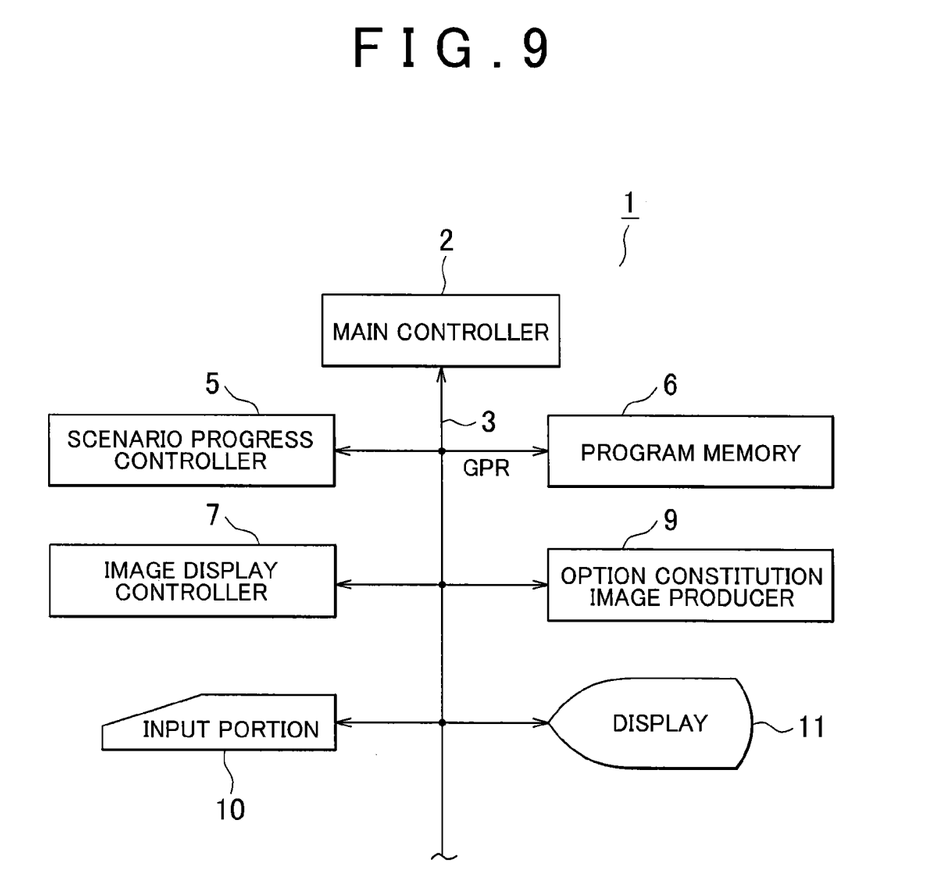
FIG. 9 is a view that shows an instance of a block diagram of a game machine for displaying option screen.

As shown in FIG. 9, a game machine for displaying option screen 1 comprising a computer has a main controller 2, and a scenario progress controller 5, a program memory 6, an image display controller 7, an option constitution image producer 9, an input portion 10, such as a controller and a keyboard, and a display 11 are connected with the main controller 2 via a bus line 3.

The game machine for displaying option screen 1 as shown in FIG. 9 executes functions shown in respective blocks as shown in FIG. 9 in such a manner that a computer reads and executes game program GPR stored in the program memory 6 so that a CPU or a memory (not shown) time-dividedly operates by multitask. But, it is also possible to structure the game machine for displaying option screen 1 by hardware corresponding to the respective blocks. Otherwise, it is also possible to control each block by a CPU or a MPU dispersedly provided in each block.

The game machine for displaying option screen 1 has the above-mentioned structure, and in order to execute some game with the game machine for displaying option screen 1, the main controller 2 reads the game program GPR out of the program memory 6 based upon a play initiating command from a player and the main controller 2 controls a progress of the game via the scenario progress controller 5 based upon the read game program GPR. The game program GPR stored in the program memory 6 is stored in the program memory 6 of the game machine for displaying option screen 1 by downloading through a communication line, such as the Internet, or reading out of various kinds of memory mediums that store the game program GPR.

Figure 10:
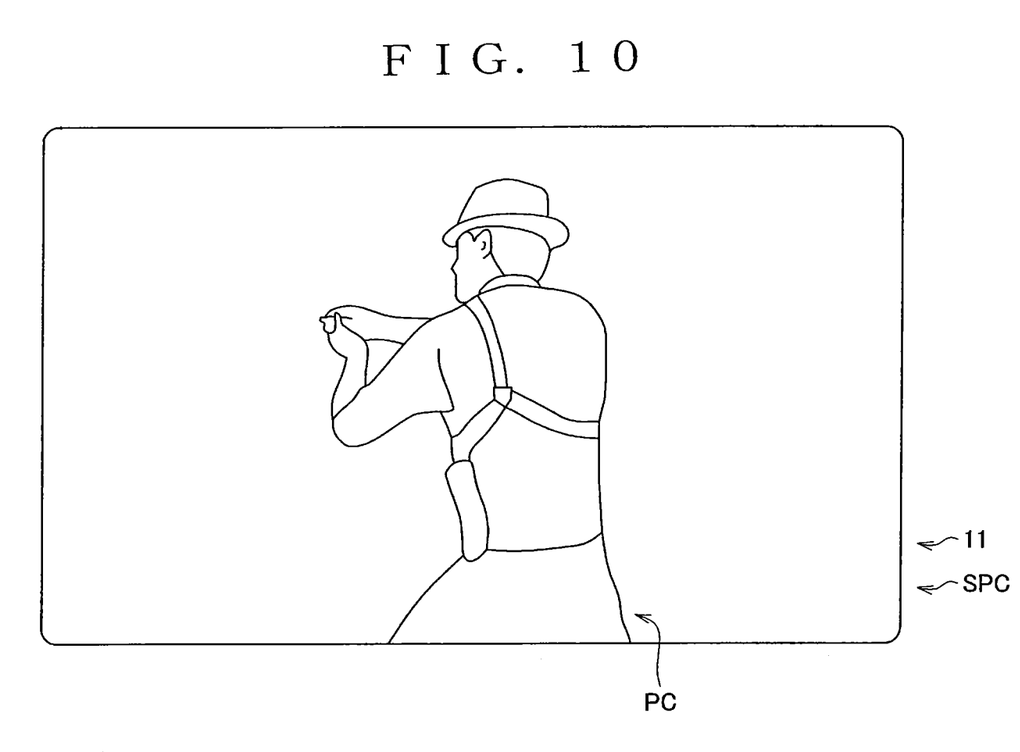
FIG. 10 is a view that shows an instance of the scenario image.

According to the game program GPR, the scenario progress controller 5 produces a lot of scenario images SPC that are frame images for advancing a game scenario on which a player character PC to be operated by a player through the input portion 10 and non-player characters (not shown) to be controlled according to the game program GPR are indicated. As shown in FIG. 10, for example, a moving image is displayed so as to advance the scenario by displaying these scenario images SPC on the display 11 in order. In some cases, at the time of the progress of the scenario, the game program GPR works to execute an option presentation event for presenting options on the display 11 through the main controller 2 and the scenario progress controller 5 so as to get the player to select some option and to change a subsequent scenario development based upon its selection result.

Figure 1:
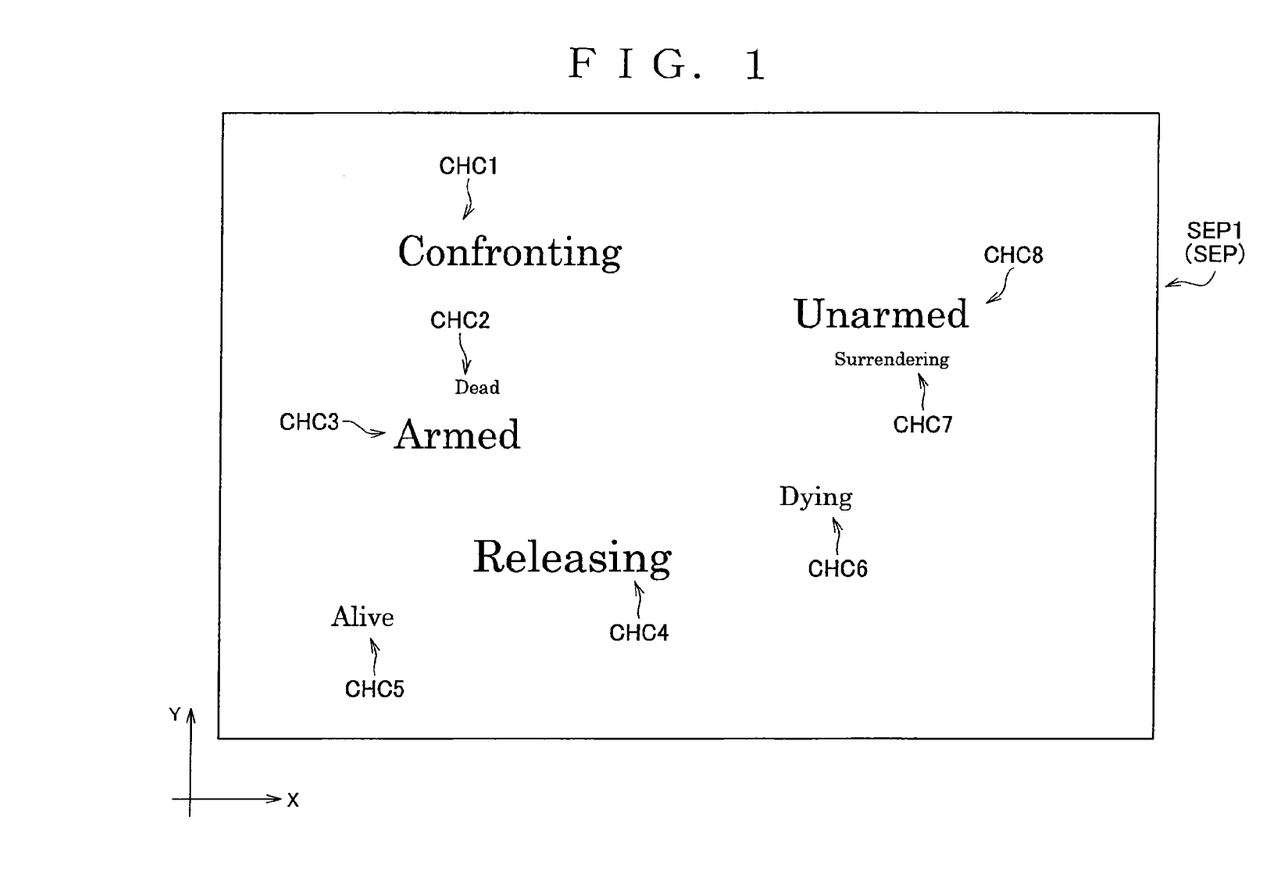
FIG. 1 is a view that shows an instance of an option constitution image comprising an option screen.
Figure 4:
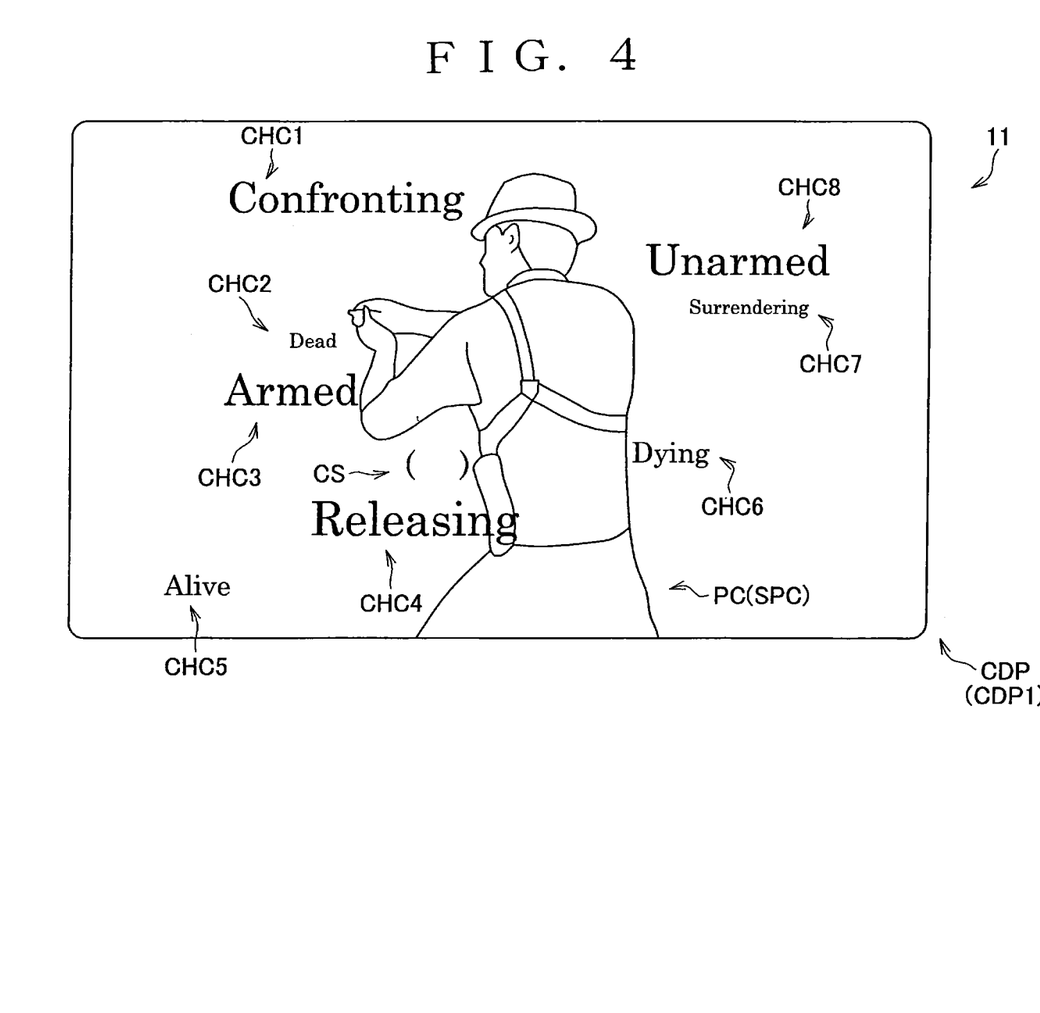
FIG. 4 is a view that shows an option display image that is made by putting the option constitution image of FIG. 1 and a scenario image together.

At the time of such an option presentation event, the main controller 2 instructs the option constitution image producer 9 to produce an option constitution image SEP as shown in FIG. 1 according to the game program GPR, and further instructs the image display controller 7 to produce an option display image CDP by putting the produced each option constitution image SEP and the scenario image SPC displayed on the display 11 together as shown in FIG. 4 and to display the produced one.

As shown in FIG. 1, the option constitution image SEP has eight options CHC1 through CHC8 that are located over the whole screen separately according to the game program GPR, and sizes of letters comprising the respective options CHC (CHCn (n=1, 2, ... 8) is used when differentiating each option from another one and only CHC is indicated when not differentiating) are different from each other. At the time of procuring the option constitution image SEP1 of FIG. 1, the option constitution image producer 9 reads an option data table TBL stored in the game program GPR (or algorithm equivalent to a selection data table) out of the program memory 6 and displays the respective options CHC according to indication forms shown in the option data table TBL.

Figure 11:
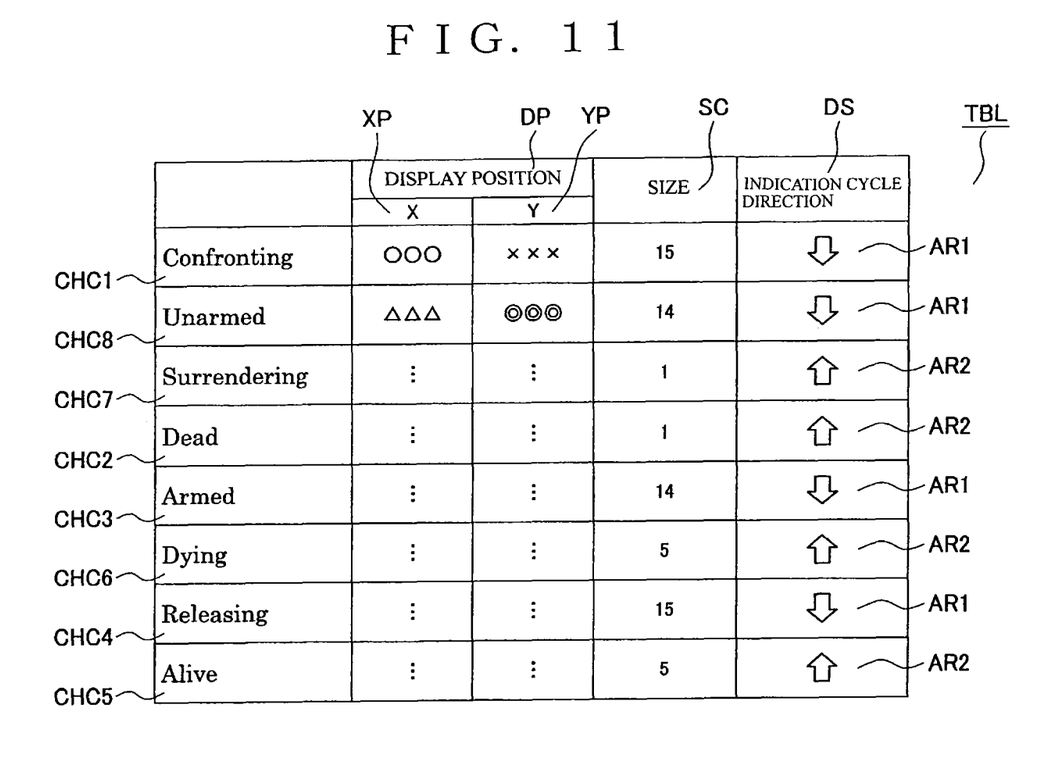
FIG. 11 is a view that shows an instance of an option data table.

That is, as shown in FIG. 11, the option data table TBL stores the options CHC1 through CHC8 to be displayed on the option constitution image SEP, indicating their display positions DP with X coordinates XP and Y coordinates YP that are set on the option constitution image SEP. The option constitution image producer 9 locates and displays the option CHC on the corresponding display position DP that is set on each option CHC. In such a case, letters comprising each option CHC are optional, and may have various types of forms, such as words, idioms and sentences. The respective options CHC are located planarly, dispersing in a right/left direction and an upper/lower direction on the option constitution image SEP, not only in the right/left direction or not only in the upper/lower direction. Besides, the option data table TBL stores sizes of letters (fonts) SC of the respective options CHC1 through CHC8 at the time when firstly displaying the options (initial indication) on the option constitution image SEP, that is, on the display 11, being divided into two or more stages, for instance. In case of FIG. 11, the sizes SC of the letters to be displayed have fifteen stages from "1" to "15" (but, may have optional stages), and "15" is the biggest indication and "1" is the smallest indication. In this case, the size of the letter means a single letter in the same indication form (such as a capital letter and a small letter), such as "A" or "U" of the capital letter of alphabet, and does not means the size between the capital letter and a small letter. That is, the size of the letter corresponds to a point number of the letter to be used in a typographic printing or so.

Various kinds of well-known methods may be adopted in order to control to enlarge/reduce the letters comprising each option CHC. In brief, it is sufficient if players notice the letters comprising the respective options CHC are displayed with different sizes on the option constitution image SEP, as shown in FIG. 1. In case of FIG. 1, the letters comprising the option CHC1 and the option CHC4 are displayed with the biggest size "15", the letters comprising the option CHC2 and the option CHC7 are displayed with the smallest size "1", the letters comprising the option CHC5 and the option CHC6 are displayed with rather small size "5", and the letters comprising the option CHC3 and the option CHC8 are displayed with the smaller size "14" rather than the biggest.

It is not necessary that the sizes of the respective options CHC1 to CHC8 are different from each other among all in the initial indication (of course, the all sizes may be different from each other), but preferably, at least two or more letters (fonts) with different sizes are used on the option constitution image SEP. The size of the indication of the option corresponds to the size of the number of dot matrixes that the letters comprising each option CHC occupy on the option constitution image SEP. The sizes of the letters comprising each option CHC in the lateral and longitudinal directions are important elements. Especially, the size in the longitudinal direction, that is, the size in Y direction is important. The lateral direction is not so important in the invention since the size in X direction is different by the number of the letters comprising each option CHC.

The option data table TBL also stores data as to how to change the indications of the options CHC after firstly displaying the options CHC as indication cycle directions DS. The game program GPR controls to enlarge or reduce each option CHC displayed on the selection constitution image SEP at a predetermined indication cycle determined by the game program GPR (time cycle) through the main controller 2 and the option constitution image producer 9.

That is, the option constitution image producer controls to enlarge or reduce the letters comprising the respective options CHC1 to CHC8 displayed on the first option constitution image SEP1 as shown in FIG. 1 step by step at an indication cycle time of ten seconds, for instance, according to the game program GPR (Optionally, the setting may be changed every option or all options may be set at the same indication cycle time). The indication cycle time is measured by a timer built in the option constitution image producer 9 and is used for the control of enlargement and reduction. The option data table TBL stores the indication cycle directions DS showing whether the letters comprising the option CHC initially displayed should be enlarged or reduced from now on when enlarging or reducing the letters comprising each option CHC at a predetermined indication cycle time. In a case where the indication cycle direction DS is indicated by downward arrow AR1, it is instructed to control to start to indicate the image of the option CHC initially displayed in the reduction direction, and the option image producer 9 controls to reduce→enlarge→reduce the option CHC for which the downward arrow AR1 is indicated at a predetermined indication cycle time. In a case of the option CHC1, for example, size SC is the biggest "15" in an initial indication, so that size SC of the option CHC1 is gradually reduced one by one from "15" to "1" between ten seconds that is the predetermined indication cycle time (may be optionally set in the game program GPR, as mentioned before), and is further enlarged from "1" to "15" in a similar way. A width of reduction of each step can be optionally set. For example, size SC may be changed at the indication cycle time 10 seconds, like 15→14→13→12→11 ... →2→1→2→3→4 ... 14→15, or may be changed at the indication cycle time 10 seconds like 15→10→5→1→5→10→15. Such indications of enlargement and reduction are repeated until the selection of the option CHC by the player finishes.

In a case of the option CHC6, the arrow shown in the indication cycle direction DS is the upward arrow AR2, so that size SC of the option CHC6 is gradually enlarged from "5" initially indicated to "15" between the predetermined indication cycle time, 10 seconds, and is further reduced from "5" to "15", and is further enlarged from "1" to "5".

Similar control is done on the other options CHC. The initially indicated size SC starts to be enlarged or reduced in the direction indicated by the indication cycle direction DS, and the control to return to the initially indicated size SC within the predetermined indication cycle time is repeatedly done.

Figure 2:
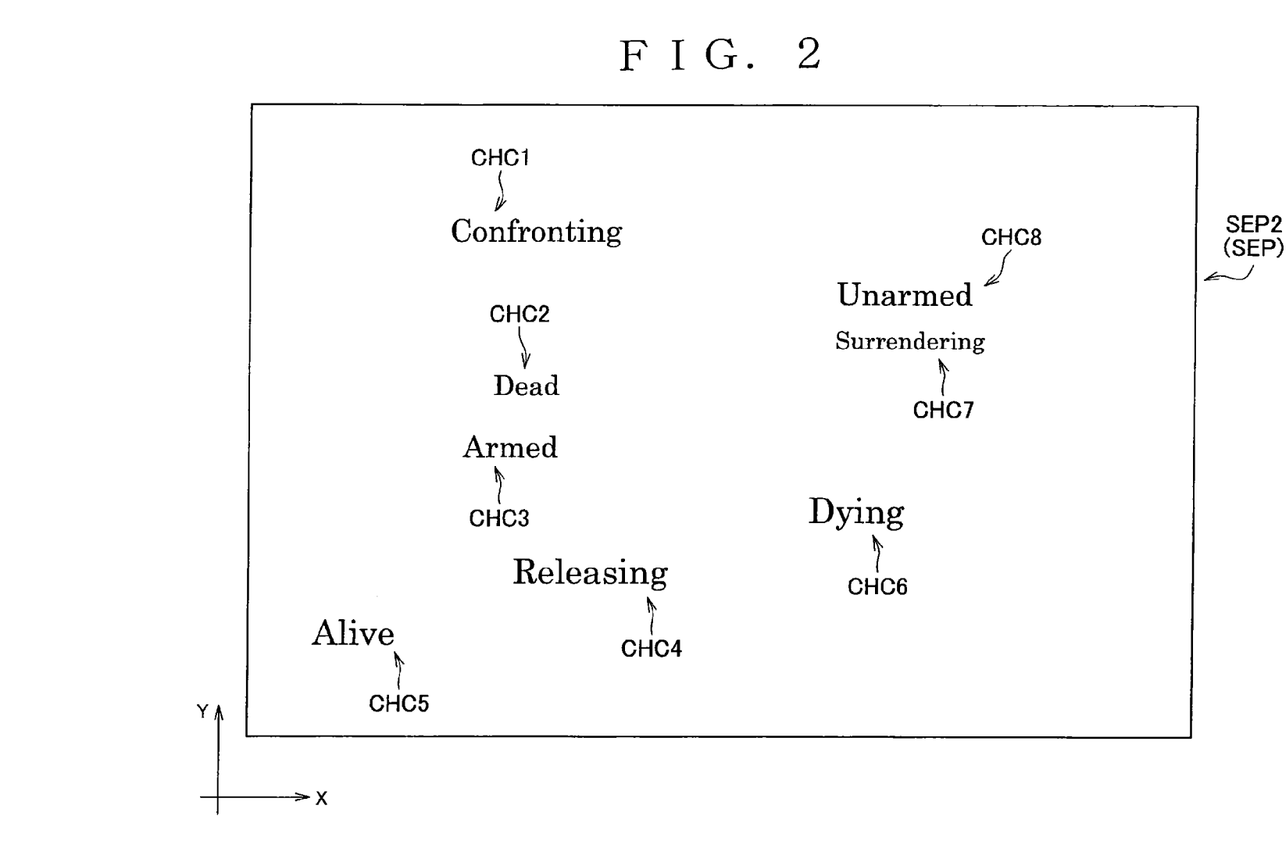
FIG. 2 is a view that shows an instance of the option constitution image of FIG. 1 displayed after a predetermined indication time cycle.
Figure 3:
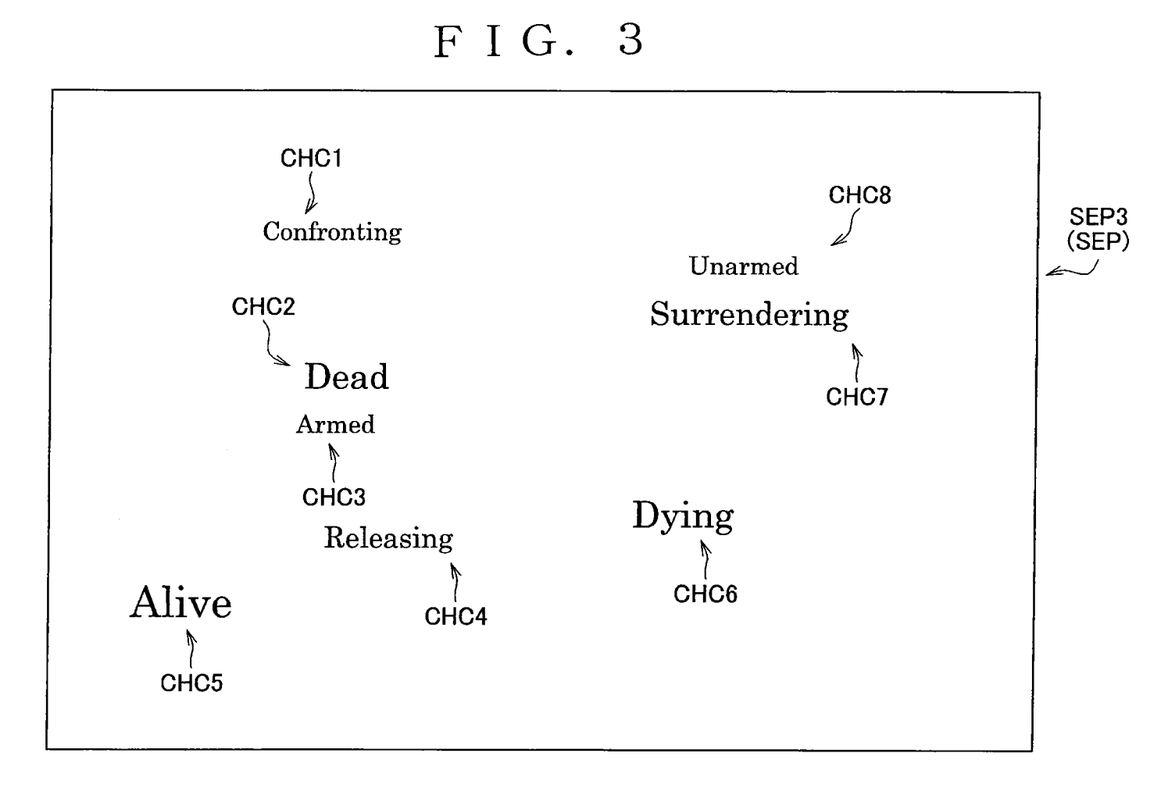
FIG. 3 is a view that shows an instance of the option constitution image of FIG. 2 displayed after another predetermined indication time cycle.
Figure 5:
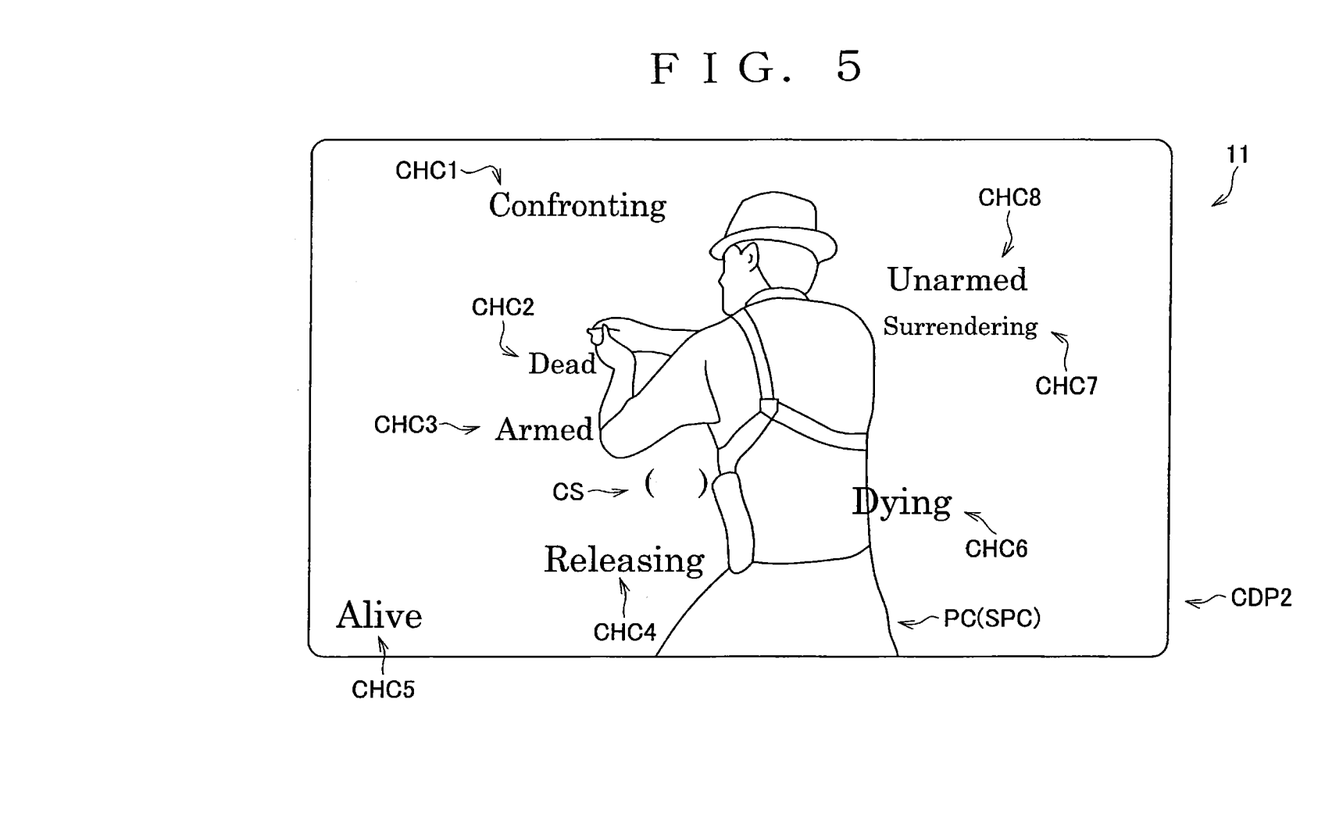
FIG. 5 is a view that shows the option display image that is made by putting the option constitution image of FIG. 2 and the scenario image together.
Figure 6:
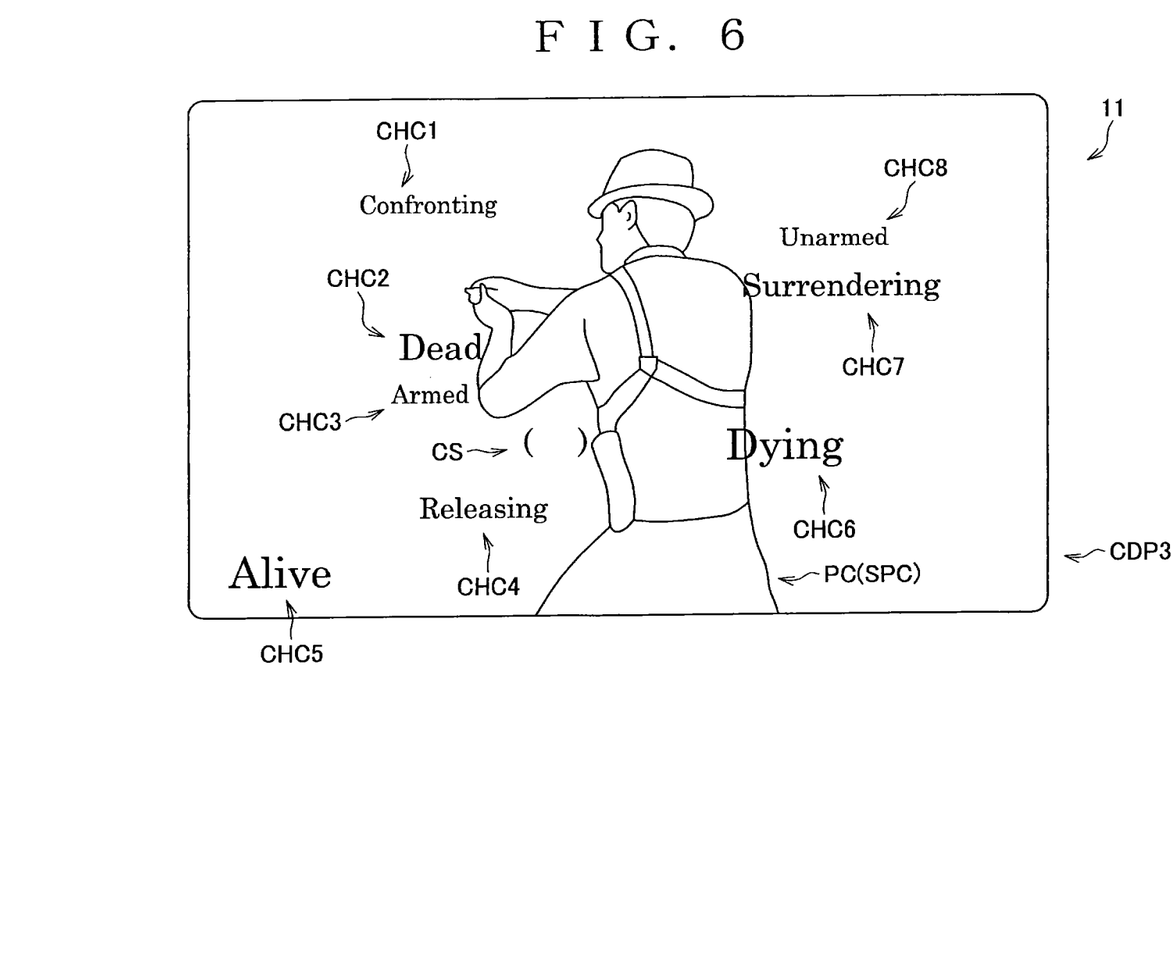
FIG. 6 is a view that shows the option display image that is made by putting the option constitution image of FIG. 3 and the scenario image together.

At the result, the option constitution image SEP is changed from the indication state as shown in FIG. 1, for example, into one as shown in FIG. 2 or 3, and is returned to the state of FIG. 1 via FIG. 2 again. That is, such an indication cycle is repeated. If the scenario image SPC as shown in FIG. 10 is superimposed on the option constitution image SEP, the option display image CDP1 through CDP3 as shown in FIG. 4 corresponding to the option constitution image SEP1 of FIG. 1 is displayed on the display 11 as an initial image. Subsequently, the option display image CDP2 as shown in FIG. 5 corresponding to the option constitution image SEP2 of FIG. 2, and furthermore, the option display image CDP3 as shown in FIG. 6 corresponding to the option constitution image SEP3 of FIG. 3 are displayed in order. Only three images, the option display images CDP3 as shown in FIGS. 4 through 6 are not displayed on the display 11, but the option display image CDP is composed every option constitution image SEP that is produced at two or more steps so as to gradually change the size at a predetermined indication cycle time through the option constitution image producer 9 and the composed option display image CDP is displayed on the display 11, as mentioned before.

Then, two or more options CHC are displayed on the display 11, repeating its enlargement and reduction. By doing so, the option CHC that is displayed on the display 11 at a some point of time has various sizes, and it is possible to display the options CHC in a relatively small area provided that the big option CHC and the small option CHC are located, adjacent to each other and the indication cycle direction DS is properly set even if there are many options CHC.

Since two or more options CHC are displayed, enlarging and reducing their sizes at a predetermined indication cycle time, it is possible to apply it to an expression, such as a swinging psychological condition of the player character and the non-player character appearing in a game.

Figure 7:
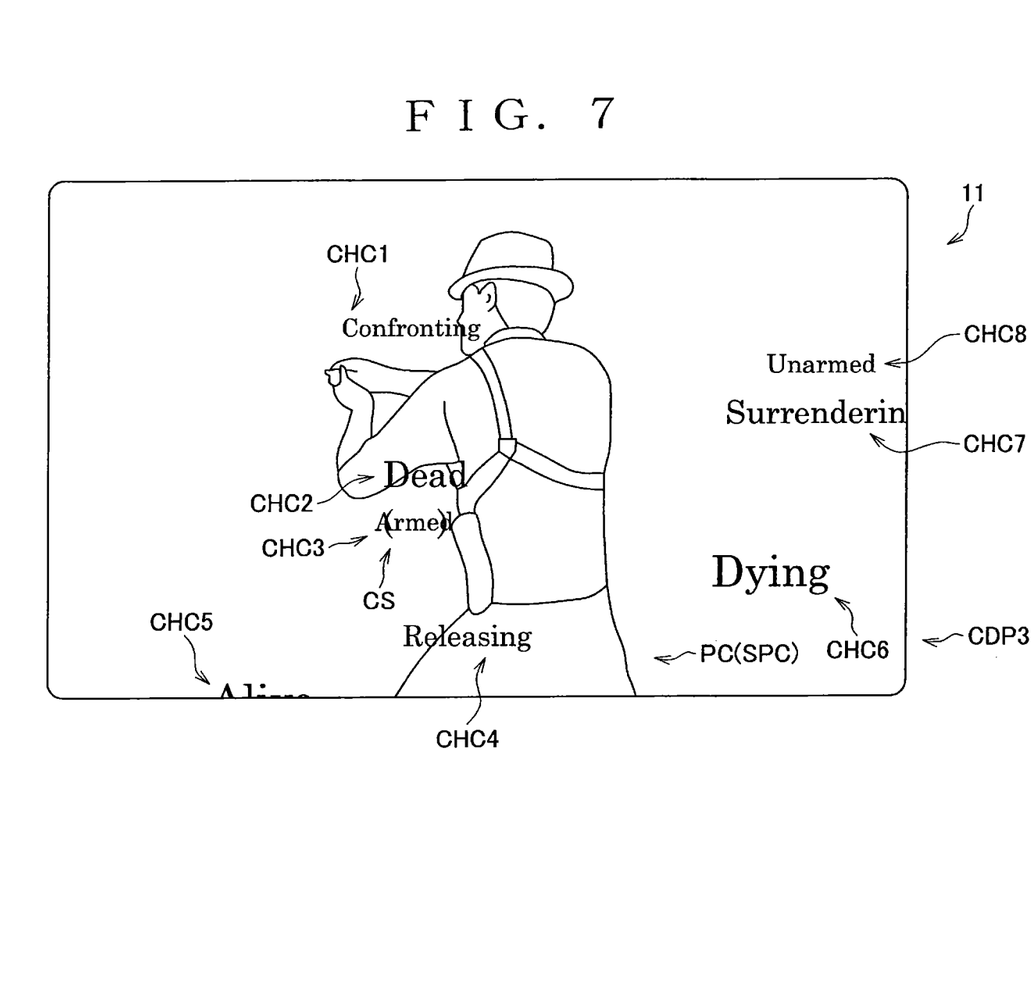
FIG. 7 is a view at the time when selecting an option with the option display image of FIG. 6.
Figure 8:
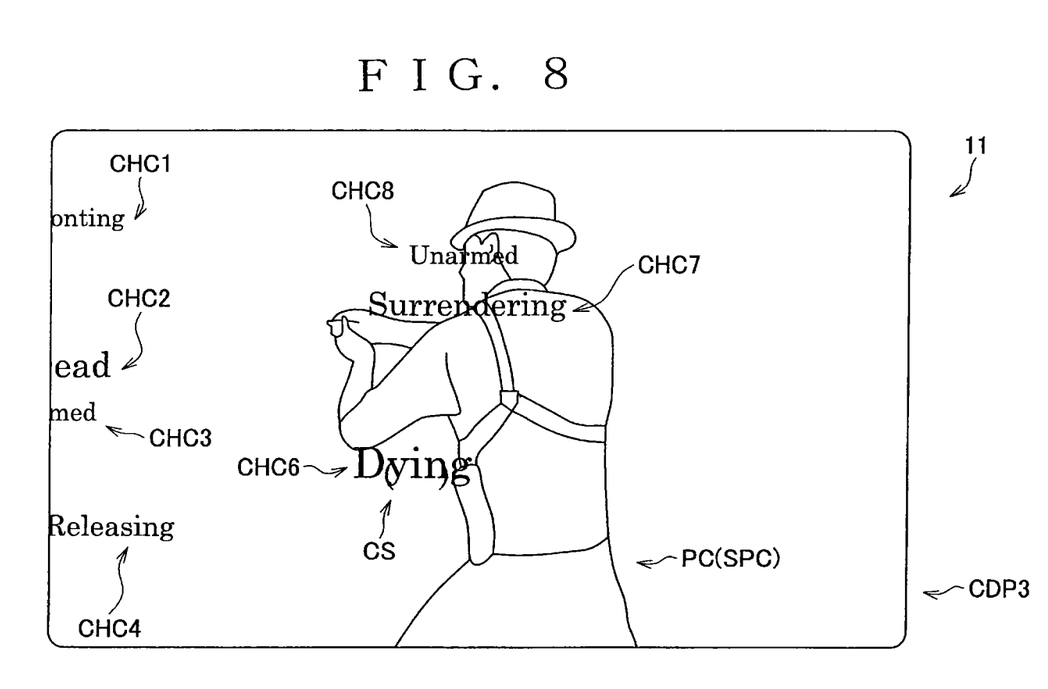
FIG. 8 is another view at the time when selecting the option with the option display image of FIG. 6.

In such a state that the option display image CDP is displayed on the display 11, the player moves and position the option CHC that the player wishes to select to a position of the input cursor CS that is located at a center of the option display image CDP through an operation of the input portion 10 as shown in FIG. 7 or FIG. 8 and pushes down the determination button. Then, such selection is fixed. A detailed explanation is not mentioned since such a method is well known. The option CHC is moved and positioned to the input cursor CS by moving the whole option constitution image SEP on which the options CHC are located in a X direction and a Y direction, and the input cursor CS is fixedly located on the scenario image SPC by the image display controller 7 according to the game program GPR through a proper layer.

When the player finishes the selection operation of the option CHC on the option display image CDP through the input portion 10, the game program GPR removes the option constitution image SEP and the input cursor CS that have been located on the scenario image SPC through the image producer 9 and puts back the option display image CDP to the usual scenario image SPC as shown in FIG. 10. The scenario progress controller 5 develops a next scenario based upon the option CHC selected by the player on the option display image CDP according to the game program GPR by composing a new scenario image SPC and displaying it on the display 11.

In the specification, the option constitution image SEP superimposed on the scenario image SPC is used as the option display image CDP, but only option display image SEP may be displayed as the option display image CDP without using the scenario image SPC.

EXPLANATION OF REFERENCE NUMBERS

5 . . . scenario progress controller (game progress controller)
7 . . . image display controller (option display image producer)
9 . . . option constitution image producer (option locator, letter indicator, enlargement/reduction indicator, enlargement/reduction cycle selector)
10 . . . input portion
11 . . . display
CDP, CDP1~CDP3 . . . option display image
CHC, CHC1~CHC8 . . . option
GPR . . . game program
SEP . . . option constitution image
SPC . . . scenario image

The invention claimed is:

1. A non-transitory game computer-readable storage medium tangibly embodying a program of instructions executable by the game machine, said game machine for displaying an option on a display that includes an option constitution image indicating two or more options for selection by a player through an input portion, said game machine functions as the following means through said program of instructions;

a data storage for storing a readable option data table from a memory, said option data table storing a coordinate position of each option to be displayed, letter sizes and an indication cycle direction that selects either enlargement or reduction of the letters corresponding to each option initially displayed on the display when displaying said option constitution image on the display, said coordinate positions of said respective options being scattered on the display, each of said two or more options being displayed with respectively different sizes;

said program of instructions comprising:

an option locator that positions letters for each of the two or more options on the option constitution image at a respective coordinate position with the respective letter size indicated by said option data table on the option constitution image when displaying each option;

an enlargement/reduction indicator that indicates the letters of each of said two or more options on said option constitution image by selecting whether to enlarge or reduce the letters for each option in the corresponding indication cycle direction indicated by said option data table with a predetermined indication cycle time; and an letter indicator that indicates said two or more options, positioned through said option locator and associated with the enlargement or reduction determined by said enlargement/reduction indicator, on the option constitution image on said display by changing the respective sizes according to the predetermined indication cycle time of said two or more options indicated on the display.

2. The non-transitory game computer-readable storage medium according to claim 1, wherein the enlargement/reduction indicator further has an enlargement/reduction cycle selector that selects and executes either control of a) reduction after enlargement or b) enlargement after reduction for every option regarding the letters comprising the option initially displayed on the display.

3. The non-transitory game computer-readable storage medium according to claim 1, further comprising a game progress controller that produces a scenario image and advances a game scenario, and an option display image producer that produces the option display image by superimposing the option constitution image on the scenario image.

* * * * *